(12) United States Patent
Farey

(10) Patent No.: US 9,582,384 B2
(45) Date of Patent: Feb. 28, 2017

(54) METHOD AND SYSTEM FOR DATA REPLICATION

(75) Inventor: Christopher John Farey, Bristol (GB)

(73) Assignee: StorMagic Limited, Bristol (GB)

( * ) Notice: Subject to any disclaimer, the term of this patent is extended or adjusted under 35 U.S.C. 154(b) by 692 days.

(21) Appl. No.: 13/069,482

(22) Filed: Mar. 23, 2011

(65) Prior Publication Data

US 2012/0246423 A1    Sep. 27, 2012

(51) Int. Cl.
- *G06F 12/00* (2006.01)
- *G06F 13/00* (2006.01)
- *G06F 13/28* (2006.01)
- *G06F 11/20* (2006.01)
- *G06F 11/07* (2006.01)
- *G06F 11/14* (2006.01)

(52) U.S. Cl.
CPC ....... *G06F 11/2076* (2013.01); *G06F 11/0709* (2013.01); *G06F 11/2074* (2013.01); *G06F 11/1446* (2013.01); *G06F 11/1456* (2013.01); *G06F 11/1466* (2013.01); *G06F 2211/1011* (2013.01)

(58) Field of Classification Search
CPC .............. G06F 11/1466; G06F 11/1446; G06F 17/30578; G06F 17/30581; G06F 2211/1011;G06F 11/2076; G06F 11/2074; G06F 11/2056; G06F 11/2069; G06F 11/2089; G06F 11/0709; G06F 11/1456
USPC ................. 711/103, 158, 162, 161; 709/224
See application file for complete search history.

(56) References Cited

U.S. PATENT DOCUMENTS

| | | | |
|---|---|---|---|
| 2002/0120717 A1* | 8/2002 | Giotta | 709/219 |
| 2002/0199073 A1* | 12/2002 | Tamura et al. | 711/162 |
| 2004/0260902 A1* | 12/2004 | Stanley | G06F 11/2058 711/165 |
| 2006/0101217 A1* | 5/2006 | Maki et al. | 711/162 |
| 2009/0100222 A1* | 4/2009 | Laker | 711/114 |
| 2010/0318812 A1* | 12/2010 | Auradkar et al. | 713/193 |
| 2012/0185433 A1* | 7/2012 | Harris et al. | 707/623 |

* cited by examiner

Primary Examiner — Yaima Rigol
Assistant Examiner — Shane Woolwine
(74) Attorney, Agent, or Firm — Gordon & Jacobson, P.C.

(57) ABSTRACT

A method and system of replicating data where data is copied from a host server to a storage device in a first group of storage devices. A receipt is sent from the first group of storage devices to the host server when the data has been copied to all storage devices within the first group. The data is copied from the first group to at least one further group of storage devices. A receipt is sent from each further group of storage devices to the first group of storage devices when the data has been copied to all storage devices within each further group.

13 Claims, 2 Drawing Sheets

METHOD AND SYSTEM FOR DATA REPLICATION

BACKGROUND OF THE INVENTION

1. Field of the Invention

The present invention relates to relates generally to the field of data replication within distributed computer systems.

2. Related Art

It is well known that storage devices (e.g. disk drives) may fail over time or may be lost due to theft or natural disasters such as fire. However, whilst hardware can usually be replaced with relative ease, the loss of data can be catastrophic as another copy cannot simply be purchased off the shelf. Therefore, individual users and organizations typically create backup copies of data so that in the event of a hardware loss, such as disk failure, normal operations can be resumed with minimal disruption.

Typically, a large organization will back up the contents of its disk drives onto (relatively slow) tape storage devices. However, a considerable length of time, perhaps several hours, may be required to take a full backup of a large data set and so backups often have to be made during 'down times' such as overnight or out of business hours. Furthermore, inconsistencies can arise if changes are made to the data while the backup is in progress and so write operations may need to be blocked while the backup is being created. However, this unavailability is not acceptable to organizations which require uninterrupted access to their data.

Therefore, it is advantageous to create an instantaneous copy of a disk's contents while applications are running. Virtualization techniques can be used within networks to create and maintain (in real-time) a replica of the data set on other storage devices, the replica being updated over time as the data changes in response to write operations. In this way, reliable access to the data may be preserved via the remotely stored replica if the local storage device becomes inoperable, whilst maintaining high availability of data and functionality. Thus, whilst a backup copy may remain unchanged for a relatively long period of time, a replica will be updated frequently as a result of applications which are running and writing updates to the data set. Several known replication techniques have been developed to copy data to other storage devices.

Mirroring

Mirroring is a known data replication technique where the contents of a logical disk volume are copied onto other storage devices. Each time a write operation occurs, the data is copied from the host server to the other storage devices. These other storage devices may be situated locally or remotely, or may sometimes be provided as a combination of both. As multiple copies of the data exist, the data can be retrieved from at least one of those copies should a hardware failure occur. Typically, the data is mirrored onto physical devices (hard drives) although logical drives may also be used. Moreover, replication may be implemented as microcode on a disk array controller or as software running on a server. FIG. 1 shows a simple illustration of a prior art mirroring arrangement.

When this process is performed over a relatively short geographical distance, the term 'mirroring' may often be used. However, the term 'storage replication' is typically used when larger geographical distances are involved. Various replication techniques are known.

Synchronous Storage Replication

Synchronous storage replication is a known data replication technique where identical copies of the data are stored on separate storage devices in communication with the host server. When performing a write operation, the server needs to know when the data has been copied to each and every storage device. Thus, each storage device sends a receipt when it has received and stored the data. The write is only considered complete when it has been performed on, and acknowledged by, all the storage devices. If one of the storage devices fails to acknowledge completion of the write operation, then the overall write operation is deemed not to have been completed.

The advantage of this approach is that high availability is possible. If one copy of the data becomes unavailable to the host server, the host server can instantly fail over and use another copy of the data, in the knowledge that the copy it is accessing contains data exactly as expected; no consistency checking of the data is necessary.

However, as applications running on the server may wait for a write operation to complete before proceeding with other operations, the overall performance of the system can decrease considerably if it takes some time for the acknowledgement to be received by the server. This latency problem increases over large geographical distances, and so synchronous replication is only really practical over smaller distances.

Asynchronous Storage Replication

Asynchronous storage replication is a known data replication technique where separate storage devices are used to store copies of the data. Although all storage devices are updated when a write operation is requested by an application, the write operation is considered complete as soon as (only) one designated storage device acknowledges it. Whilst long-distance performance is greatly increased in comparison to the synchronous approach, if the designated storage device fails then the other storage device(s) are not guaranteed to store the current copy of data. Thus, whilst synchronous mirroring usually achieves a Recovery Point Objective (RPO) of zero lost data, with asynchronous writing the most recent updates to the data may be lost and the application data stored may not be self consistent. Thus, there is a problem of 'crash-consistency' which typically necessitates data consistency checking and repair before the copy is usable.

SUMMARY OF THE INVENTION

The problems of the prior art are solved by the present invention, which combines the asynchronous and synchronous storage replication techniques to capture their benefits but avoid or at least alleviate their respective disadvantages.

In accordance with the present invention, there is provided a method of replicating data, the method comprising the steps of:

copying data from a host server to a storage device in a first group of storage devices;

sending a receipt from the first group of storage devices to the host server when the data has been copied to all storage devices within the first group;

copying the data from the first group to at least one further group of storage devices; and sending a receipt to the first group from each further group of storage devices when the data has been copied to all storage devices within each further group.

The first group of storage devices (or 'nodes' or 'plexes') may be called the 'active' group. The at least one further group of storage devices (or 'nodes' or 'plexes') may be called the 'passive' group(s).

Preferably, a receipt is sent from the first group of storage devices to the host server when the first group has received a receipt from a further group of storage devices. This provides the advantage that the host server 'knows' that at least one copy of the data has been created.

Preferably, the host server is only in direct communication with the first group of storage devices. Therefore, the host server is not in direct communication with storage devices in any other groups other than the first (active) group.

Preferably, a further group of storage devices assumes the role of the first group of storage devices upon failure or incapacity of the first group. This provides the advantage that the system remains operable in the event of hardware loss or failure.

Preferably, communication between the host server and the first group of storage devices is accomplished using a block storage protocol. The block storage protocol may be the SCSI logical protocol over any physical transport such as, for example SCSI-2, Fiber channel, iSCSI, SAS. However, the invention is not intended to be limited in this regard.

Preferably, the first group of storage devices uses the receipts received from the at least one further group of storage devices to monitor the state of the further group or groups.

Preferably, the first group of storage devices marks a further group of storage devices as unsynchronized if no receipt is received from that further group. This provides the advantage that any problems arising within any of the groups of storage devices may be detected and/or addressed.

Preferably, more than one further group of storage devices is provided. This provides the advantage that, in the event of loss of one group, the data remains available via the other groups.

Preferably, the host server sends data to the first group of storage devices continuously. Thus, the host server may send data to the active group on an ongoing basis, unless a technical failure causes an interruption in communication to arise.

Preferably, any storage device in the first group is configured to receive data from and/or send data to the host server. This provides a flexible mechanism for communication between the host server and the active group.

Preferably, the first group of storage devices selects one storage device in each of the at least one further groups, the selected node being responsible receiving input, sending output and/or forwarding requests to other storage devices within the same group.

In accordance with a second aspect of the invention there is provided a system for replicating data in accordance with the above described method. The system may comprise:
  a host server configured to send data to a storage device in a first group of storage devices, wherein the first group of storage devices is configured to send a receipt to the host server when the data has been copied to all storage devices within the first group, and copy the data to the at least one further group of storage devices; and
  the at least one further group of storage devices is configured to send a receipt to the first group when the data has been copied to all storage devices within the further group.

These and other aspects of the present invention will be apparent from and elucidated with reference to the embodiment described herein.

An embodiment of the present invention will now be described, by way of example only, and with reference to the accompanying drawings.

DETAILED DESCRIPTION OF THE PREFERRED EMBODIMENTS

Figure 1:
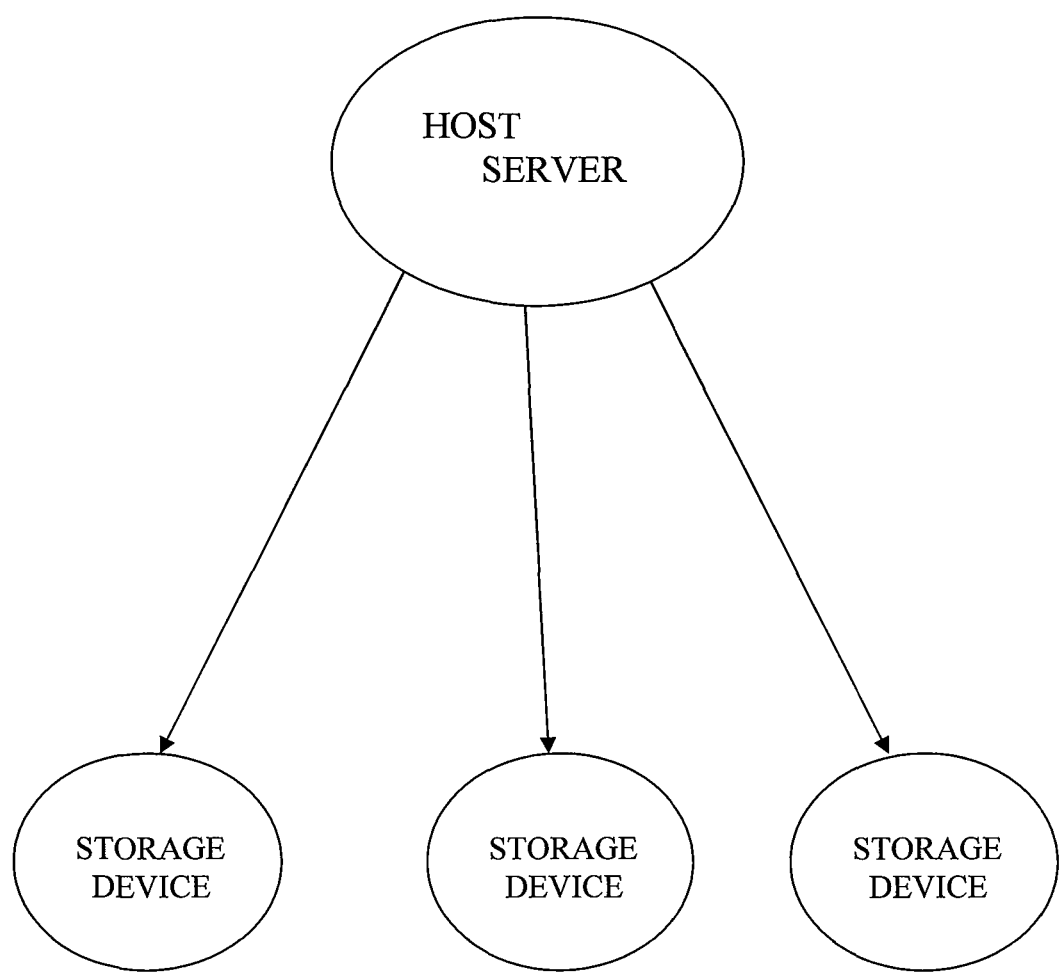
FIG. 1 illustrates a prior art approach to mirroring of data.
Figure 2:
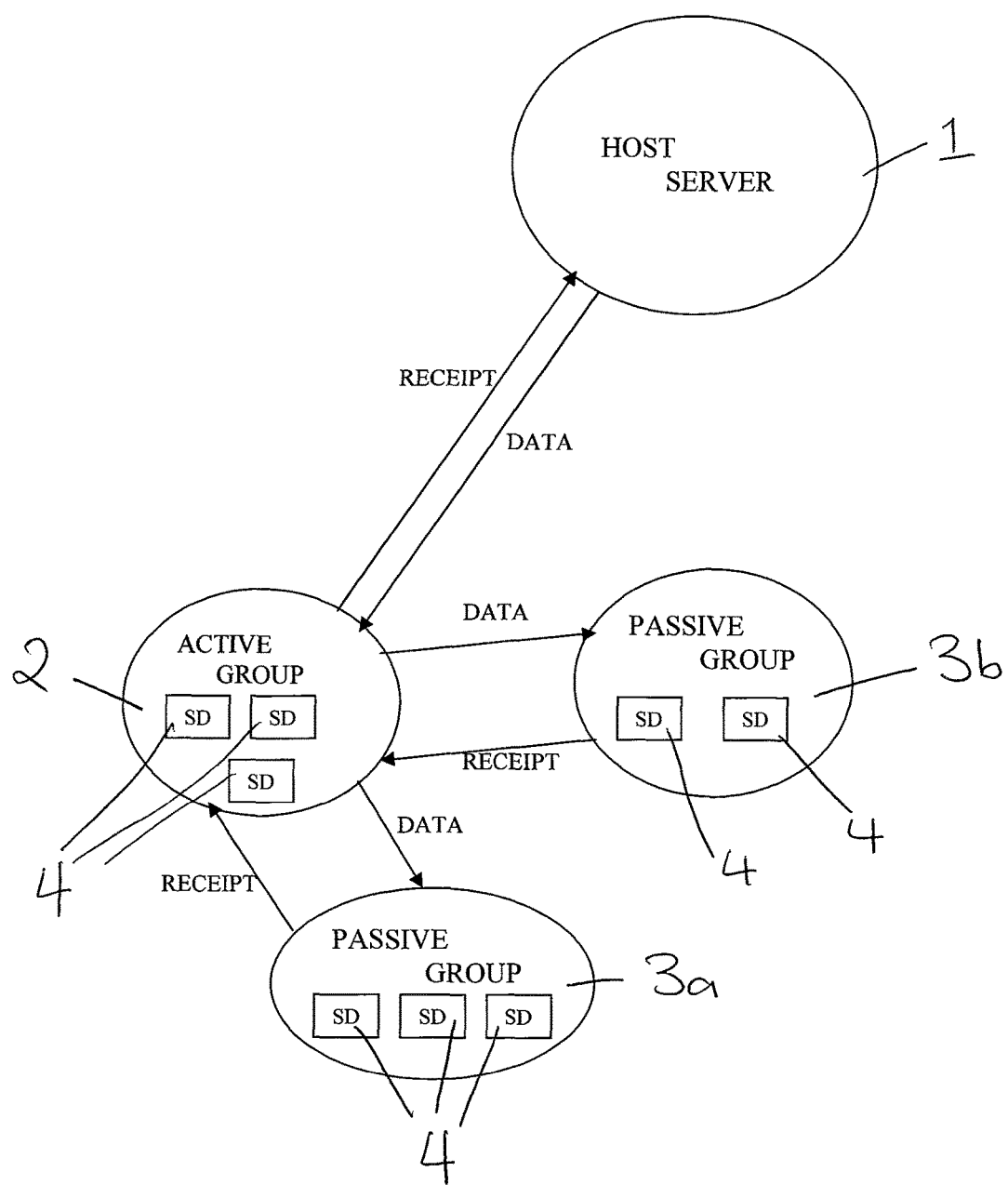
FIG. 2 shows an embodiment of the present invention.

Turning to FIG. 2, a network of interconnected computing devices includes at least one host server 1 in communication with at least one storage device. Software running on the server is configured such that the server is able to communicate with the other devices.

It should be noted that the invention may comprise more than one host server. A plurality of host servers may be clustered such that applications can be transferred to another server within the cluster should a failure occur.

A plurality of storage devices 4 (sometimes referred to as 'plexes' or 'nodes') is also provided. The storage devices 4 are conceptually linked to form clusters or groups 2, 3a, 3b of associated devices 4. The storage devices 4 in each group 2, 3a, 3b are configured to communicate with each other in a synchronous relationship. As such, a cluster of storage devices may be known as a 'synchronicity group'. There may be any number of storage devices 4 within an individual synchronicity group 2, 3a, 3b. There may be any number of synchronicity groups 2, 3a, 3b.

The host server 1 is in communication with a first, designated group 2 of storage devices 4. This first group may be called the 'active' group 2. The storage devices within the active group 2 are associated with one another to form a logical cluster. One (and only one) group is designated as the active group at any given time. The active group 2 is arranged and configured to receive data sent to it from the host server 1. The other, remaining group(s) is/are 'passive' in the sense that they are not in direct communication with the host server 1. That is, data is sent from the host server 1 to the active group only, and only the active group 2 ever communicates with the host server 1.

An asynchronous relationship exists between the active group 2 of storage devices and the passive group(s) 3a, 3b such that the active group is able to send and receive data and communications to/from the passive groups in an asynchronous fashion. In other words, when data is sent from the active group 2 to the passive groups 3a, 3b in order for that data to be replicated on the storage devices 4 within the passive groups, the active group 2 will deem the replication process to be complete when an acknowledgement or receipt is received from one of the passive groups 3a or 3b. Thus, once a receipt has been received from at least one of the passive groups, the active group 2 'knows' that the data has been safely replicated onto at least one other group of devices 3a, 3b such that should the active group become inoperable, the data can still be accessed from another group 3a, 3b of devices 4.

The replication of the data within each of the passive groups is conducted using a synchronous approach. Thus, a passive group will only send back an acknowledgement to the active group once each and every storage device within that passive group has confirmed that the data has been copied and stored on it. Thus, the inter-device (i.e. internally to each group) relationship is synchronous, but the inter-group relationship is asynchronous.

Thus, the invention can be said to provide a combination or fusion of the asynchronous and synchronous approaches.

In use, when data is to be replicated the host server 1 sends a copy of the data to the designated active group 2.

The host server 1 sends data continuously to the active group for replication, as long as there is a connection established with the active group.

The data is received by the active group 2 and is copied to all of the online storage devices within that active group using a synchronous approach. If any storage device in the active group is offline for some reason, then it does not participate in the replication process until such time as it has come back online and all changes made to other devices in the group have been resynchronized.

Thus, each storage device within the group 2 generates a receipt when it has received and stored the data. When the write operation has been performed and acknowledged by all of the storage devices within the active group 2 the overall write operation is deemed to be complete and a receipt is sent from the active group 2 to the host server 1 to acknowledge completion of the write operation. Thus, the host server 1 'knows' that the data has been copied to all of the storage devices in the active group 2.

Any storage node in the active group can receive the write request from the host 1. The storage device which receives the request is responsible for forwarding the request to other nodes/devices within the group and then sending the acknowledgement back to the host 1 when the other devices within the group have acknowledged receipt.

However, should a hardware failure occur within the active group 2 the data copy might become inaccessible. Therefore, the active group 2 replicates the data to at least one other group of storage devices i.e. to a passive group or groups 3a, 3b. The host server 1, however, does not need to be involved in this further replication process as the active group 2 has already been satisfied that a copy has been made. Thus, the host server 1 is free to perform its functions.

Each passive group 3a, 3b behaves in a similar fashion to the active group 2 as described above because all storage devices within the active 2 and the passive 3a, 3b groups are interrelated in the same way. In other words, the data is copied to each of the online storage devices within the passive group 3a, 3b in a synchronous manner. Thus, when the active group 2 sends a copy of the data to a passive group 3a, 3b, the data is written to all of the online devices within that group. If any storage device within a given passive group is offline for some reason, then it does not participate in the replication process until such time as it has come back online and all changes made to other devices within that group have been resynchronized.

The active group selects one node in each passive group to receive input/output, the selected node being responsible for forwarding request to all of the other nodes in the group.

As each individual storage device completes the write operation, it generates a receipt. Once all of the storage devices in the group have completed the write operation and generated a receipt to acknowledge this, the write operation is deemed complete for that entire passive group. A receipt is then sent from the passive group to the active group to indicate that the overall synchronous write operation has been completed for that group.

The active group uses the receipts sent to it from the passive groups to keep track of the state of the passive groups. If no receipt is received from a particular passive group then it marks that passive group as unsynchronized and in need of resynchronization.

As soon as the active group 2 receives a receipt from a passive group, 3a or 3b, it 'knows' that the write operation has succeeded on at least one other cluster of storage devices and so an alternative copy of the data will be available should the active group 2 fail.

It should be noted that in acknowledging receipt to the host server 1, the active group 2 is only acknowledging receipt by all devices in its own (active) group 2. The active group 2 does not make any claim or acknowledgement regarding the success of the write operation by any other group 3a, 3b. The host server 1 does not know, and does not need to know, whether an alternative copy has been made as this is left to the responsibility of the active group 2 to effect and monitor.

In the event that the active group 2 suffers a failure, another (passive) group, 3a or 3b, will assume the role of the active group. Thus, a previously passive group becomes the designated active group and communication between the newly-designated active group and the host server 1 is established.

The terms 'active' and 'passive' are used herein to indicate the role of the clusters in respect of their relationship with the host server. The active group is the only group which is exposed to the host server (via SCSI protocol) at any given time, and which communicates directly with the host server receiving data directly from the host and sending back a receipt to indicate when the write operation has been completed within the active group. In contrast, the passive group(s) only receive data from the active group, not directly from the host server. When the write operation has been completed in respect of all storage devices within an individual passive group 3a, 3b the receipt is sent to the active group 2 rather than back to the host server 1.

The present invention provides at least the following advantages:
- as synchronous replication techniques are used to copy data to the storage devices within each group; thus, the zero data loss is achieved by synchronously writing to storage devices within a cluster;
- as the relationship between the clusters is asynchronous, they can be distributed over larger geographical areas without the loss of performance because the active cluster considers the write operation to be complete when only one receipt has been received from a passive cluster. Thus, the problem of latency is reduced;
- as it is ensured that a copy of the data has been saved on the active group of storage devices and also on at least one other group of devices, the loss of one copy is not fatal to the availability of the data.

There have been described and illustrated herein several embodiments of a method and system for data replication. While particular embodiments of the invention have been described, it is not intended that the invention be limited thereto, as it is intended that the invention be as broad in scope as the art will allow and that the specification be read likewise. Thus, in the claims below, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage. It will therefore be appreciated by those skilled in the art that yet other modifications could be made to the provided invention without deviating from its spirit and scope as claimed.

The invention claimed is:

1. A method of replicating data, the method comprising the steps:
   providing a first cluster of storage devices that includes a first plurality of storage devices;
   providing at least one further cluster of storage devices that includes a second plurality of storage devices;
   replicating data from a host server to all storage devices of the first plurality of storage devices within the first cluster of storage devices;
   sending a receipt from the first cluster of storage devices to the host server when the data has been replicated to all storage devices of the first plurality of storage devices within the first cluster;
   sending the data from the first cluster of storage devices to a respective designated storage device of each further cluster of storage devices using an asynchronous approach;
   the respective designated storage device of each further cluster of storage devices initiating replication of data to all storage devices of the second plurality of storage devices within each further cluster using a synchronous approach; and
   the designated storage device of each given further cluster of storage devices sending a receipt to the first cluster when the data has been replicated to all storage devices of the second plurality of storage devices within the given further cluster;
   wherein the first cluster of storage devices is the only cluster of storage devices which is designated as the active cluster and is in direct communication with the host server;
   wherein each further cluster is passive and not in direct communication with the host server, and is configured to receive data only from the active cluster; and
   wherein one further cluster of storage devices assumes the role of the active cluster upon failure or incapacity of the active cluster.

2. A method according to claim 1, wherein:
   a receipt is sent from the first cluster of storage devices to the host server when the first cluster has received a receipt from a further cluster of storage devices.

3. A method according to claim 1, wherein:
   communication between the host server and the first cluster of storage devices is accomplished using a block storage protocol.

4. A method according to claim 1, wherein:
   the first cluster of storage devices uses the receipts received from the given further cluster to monitor the state of the given further cluster.

5. A method according to claim 1, wherein:
   the first cluster of storage devices marks a particular further cluster of storage devices as unsynchronized if no receipt is received from that particular further cluster.

6. A method according to claim 1, wherein:
   more than one further cluster of storage devices is provided.

7. A method according to claim 1, wherein:
   the host server sends data to the first cluster of storage devices continuously.

8. A method according to claim 1, wherein:
   every storage device of the first plurality of storage devices within the first cluster is configured to receive data from and/or send data to the host server.

9. A method according to claim 1, wherein:
   the first cluster of storage devices selects one storage device in each further cluster as the designated storage device, the selected storage device being responsible receiving input, sending output and/or forwarding requests to other storage devices within the same further cluster.

10. A method according to claim 1, wherein:
    the data is replicated from a plurality of host servers.

11. A system for replicating data employing the method of claim 1.

12. A system for replicating data, the system comprising:
    a host server operably coupled to a first cluster of storage devices, wherein the first cluster of storage devices comprises a first plurality of storage devices and is configured to replicate data supplied from the host server and to send to a receipt to the host server when the data has been replicated to all storage devices of the first plurality of storage devices within the first cluster; and
    at least one further cluster of storage devices comprising a second plurality of storage devices and operably coupled to the first cluster of storage devices, wherein each given further cluster includes a designated storage device that receives the data from the first cluster of storage devices using an asynchronous approach and that initiates replication of the data to all storage devices of the second plurality of storage devices within the given further cluster using a synchronous approach and that sends a receipt to the first cluster when the data has been replicated to all storage devices of the second plurality of storage devices within the given further cluster;
    wherein the first cluster of storage devices is the only cluster of storage devices which is designated as the active cluster and is in direct communication with the host server;
    wherein each further cluster is passive and not in direct communication with the host server, and is configured to receive data only from the active cluster; and
    wherein one further cluster of storage devices assumes the role of the active cluster upon failure or incapacity of the active cluster.

13. A system according to claim 12, wherein:
    the first cluster of storage devices selects one storage device in each further cluster as the designated storage device, the selected storage device being responsible receiving input, sending output and/or forwarding requests to other storage devices within the same further cluster.

* * * * *